(12) United States Patent
Bess et al.

(10) Patent No.: US 10,614,689 B2
(45) Date of Patent: Apr. 7, 2020

(54) METHODS AND SYSTEMS FOR USING PATTERN RECOGNITION TO IDENTIFY POTENTIAL SECURITY THREATS

(71) Applicant: Ridgewood Technology Partners, LLC, Reston, VA (US)

(72) Inventors: Alphonsus A. Bess, Leesburg, VA (US); Joel G. Combs, Haymarket, VA (US); Yardley M. San Gabriel, Oakton, VA (US)

(73) Assignee: Ridgewood Technology Partners, LLC, Reston, VA (US)

( * ) Notice: Subject to any disclaimer, the term of this patent is extended or adjusted under 35 U.S.C. 154(b) by 0 days.

(21) Appl. No.: 16/124,963

(22) Filed: Sep. 7, 2018

(65) Prior Publication Data

US 2019/0073885 A1 Mar. 7, 2019

Related U.S. Application Data

(60) Provisional application No. 62/555,190, filed on Sep. 7, 2017.

(51) Int. Cl.
| | |
|---|---|
| *G08B 21/00* | (2006.01) |
| *G08B 13/22* | (2006.01) |
| *G08B 21/18* | (2006.01) |
| *H04L 29/06* | (2006.01) |
| *G06N 20/00* | (2019.01) |

(Continued)

(52) U.S. Cl.
CPC ......... *G08B 13/22* (2013.01); *G06K 9/00288* (2013.01); *G06N 20/00* (2019.01); *G08B 21/182* (2013.01); *G08B 23/00* (2013.01); *H04L 63/30* (2013.01); *H04L 63/302* (2013.01); *H04L 63/0209* (2013.01)

(58) Field of Classification Search
CPC ... G06K 9/00288; G08B 21/182; G08B 21/22
See application file for complete search history.

(56) References Cited

U.S. PATENT DOCUMENTS

| | | | | |
|---|---|---|---|---|
| 2005/0207622 | A1* | 9/2005 | Haupt | G06K 9/00288 |
| | | | | 382/118 |
| 2008/0000966 | A1* | 1/2008 | Keiser | G06Q 10/10 |
| | | | | 235/382 |

(Continued)

*Primary Examiner* — Andrew W Bee
(74) *Attorney, Agent, or Firm* — The Marbury Law Group, PLLC

(57) ABSTRACT

Various embodiments include methods and computing devices configured to detect and respond to potential security threats. A computing device may be configured to receive intelligence data (e.g., image, sound recording, biometric information, etc.) from a plurality of intelligence data collection source components, and use artificial intelligence, machine learning, pattern recognition, cognitive analysis, and/or other similar techniques to identify an element of interest in the received data and determine whether a connection condition exists between a known target information element and a known collateral information element. The computing device may generate notification or alert message identifying an existence of the potential security threat in response to determining a connection condition exists, and send the message to the appropriate component, entity, or agency.

19 Claims, 8 Drawing Sheets

(51) Int. Cl.
*G08B 23/00* (2006.01)
*G06K 9/00* (2006.01)

(56) References Cited

U.S. PATENT DOCUMENTS

| | | | |
|---|---|---|---|
| 2013/0246388 A1* | 9/2013 | Benini | G07C 9/00158 |
| | | | 707/706 |
| 2016/0358080 A1* | 12/2016 | Blanco | G08B 15/007 |
| 2017/0344810 A1* | 11/2017 | Askari | G06K 9/00288 |
| 2018/0159593 A1* | 6/2018 | Bogdan | H04L 67/26 |
| 2018/0181841 A1* | 6/2018 | Vendrig | G06K 9/6267 |
| 2018/0184244 A1* | 6/2018 | Bestor | H04W 4/022 |

* cited by examiner

Detail for:
DC Cam X12345  [LIVE]  Recorded
Owner: DC Field Office

TARGET: Corcoran House at Dupont Circle

Coordinates: 38.912097, -77.041977
Location: 18th St. NW & Corcoran St. NW
IP Address: 68.62.123.456

NOTIFICATIONS

| | | | | | |
|---|---|---|---|---|---|
| Jose Martinez | 3 | 5 | 38.912097, -77.041977 | 68.62.123.456 | 09-01-2017 06:52PM |
| Unknown | 2 | 9 | 38.912097, -77.041977 | 68.62.123.456 | 05-09-2017 08:48AM |
| Lawrence Simmons | 5 | 6 | 38.912097, -77.041977 | 68.62.123.456 | 05-08-2017 11:29AM |
| Aaron Griffin | 6 | 4 | 38.912097, -77.041977 | 68.62.123.456 | 06-15-2017 11:41PM |
| VA 6GC L06 | 1 | 14 | 38.912097, -77.041977 | 68.62.123.456 | 05-24-2017 07:10AM |
| Briefcase, brown | 4 | 8 | 38.912097, -77.041977 | 68.62.123.456 | 07-26-2017 01:42PM |

STORYLINE                                    VIEW: ALL

| EVENT Jose Martinez (1) | 06:52PM |
| 08:49AM | ACTIVITY Unknown |
| EVENT VA 6GC L06 | 07:10AM |
| INCIDENT Lawrence Simmons (3) | 11:29AM |
| 01:42PM | ACTIVITY MD 3AJ054 |
| EVENT Aron Griffin (4) | 11:41AM |

COLLATERALS:  ALL (5) 1   (9) 2   (6) 3   (4) 4   (14) 5   (8) 6

FIG. 5A

METHODS AND SYSTEMS FOR USING PATTERN RECOGNITION TO IDENTIFY POTENTIAL SECURITY THREATS

RELATED APPLICATIONS

This application claims the benefit of priority to U.S. Provisional Application No. 62/555,190 entitled "Methods and Systems for Identifying Designated Human Activities" filed Sep. 7, 2017, the entire contents of which are incorporated herein by reference for all purposes.

BACKGROUND

Law enforcement organizations tend to get inundated with intelligence information, making threat assessment and/or prevention difficult. For example, even when law enforcement personnel are able to recognize a bad actor picked up on a surveillance camera, that personnel may be unable to readily identify a connection between that bad actor and other individuals, places, or objects that might clearly suggest a threat is imminent. Similarly, security personnel charged with observing human behavior for employers, educators, and other groups may face comparable issues. In addition, the vast quantity of intelligence information being collected is very difficult to quickly or effectively process. Thus, even though actions or events leading up to a crime or other designated human activities may be captured by surveillance, a connection between those actions or events may not be made or may not be made in time to prevent a crime, mitigate tragedy, or deter undesirable human conduct. Organizations that track and/or monitor human activity may benefit from a system that may quickly and reliably analyze large quantities of data collected form a multitude of disparate sensors to detect potential security threats, suspicious behaviors or notable human activities that may lead to undesirable consequences.

SUMMARY

The various aspects include methods of detecting a potential security threat, including receiving, via a processor in a computing device, intelligence data that includes at least one of an image, sound recording, biometric information, or communication transaction information, determining whether a connection condition exists between a known target information element (IE) and a known collateral IE based on the received intelligence data, and generating and transmitting an alert message identifying an existence of the potential security threat in response to determining the connection condition exists between the known target IE and the known collateral IE. In an aspect, the method may include determining whether the received intelligence data includes an element of interest (EOI), generating or updating an EOI IE that characterizes the EOI in response to determining that the received intelligence data includes an EOI, determining whether the generated EOI IE matches a known IE stored in a list of known elements, and classifying the EOI IE as the known target IE or the known collateral IE in response to determining that the generated EOI IE matches at least one known IE stored in the list of known elements.

In a further aspect, the method may include determining a first location and a first location time value for the EOI IE, comparing the first location to location information associated with each of the known IEs stored in the list of known elements to generate comparison results, using the comparison results to determine whether the first location is within a predetermined distance of a second location associated with a second IE stored in the list of known elements, identifying a second location time value associated with the second IE in response to determining that the first location is within the predetermined distance of the second location associated with the second IE stored in the list of known elements, determining whether a difference between the first location time value and the second location time value exceeds a threshold time value, incrementing a number of contacts value in response to determining that the difference between the first location time value and the second location time value does not exceed the threshold time value, and wherein determining whether the connection condition exists between the known target IE and the known collateral IE includes determining whether the number of contacts value exceeds a max contacts threshold value, and determining that the connection condition exists in response to determining that the number of contacts value exceeds the max contacts threshold value.

In a further aspect, the method may include determining a communications value that identifies a number of communications within a predefined amount of time between the EOI and an element characterized by the second IE, and incrementing the number of contacts value by the determined communications value prior to determining whether the number of contacts value exceeds the max contacts threshold value. In a further aspect, the method may include determining whether the second IE is classified as a target or collateral, wherein the operation of identifying the second location time value associated with the second IE is performed in response to determining that the second IE is classified as the target and the EOI IE is classified as the known target IE, determining that the second IE is classified as the target and the EOI IE is classified as the known collateral IE, or determining that the second IE is classified as the collateral and the EOI IE is classified as the known target IE.

In a further aspect, generating or updating the EOI IE that characterizes the EOI includes generating or updating the EOI IE to include a location value, a time value, and one of incident data or a distinguishing feature value. In a further aspect, wherein classifying the EOI IE as a known target element or a known collateral element includes classifying the EOI IE as the known target element, and wherein generating or updating the EOI IE that characterizes the EOI further includes generating or updating the EOI IE to include a list of contemporaneously identified collateral IEs.

In a further aspect, determining whether the connection condition exists between the known target IE and the known collateral IE includes determining a number of contacts value based on contact information associated with the known target IE, contact information associated with the known collateral IE and contact information associated with a second known collateral IE, determining whether the number of contacts value exceeds a max contacts threshold value, and determining that the connection condition exists in response to determining that the number of contacts value exceeds the max contacts threshold value.

In a further aspect, determining whether the connection condition exists between the known target IE and the known collateral IE includes determining whether a composite risk rating of the known target IE and the known collateral IE exceeds a rating threshold. In a further aspect, the method may include monitoring movements, communications, or activities a known target characterized by the known target IE over a period of time, generating a behavior IE that characterizes movements, communications, or activities of the known target, determining a probability value that indicates a likelihood that the known target will approach a known collateral characterized by the known collateral IE, and determining whether the probability value exceeds a threshold value, wherein determining whether the connection condition exists between the known target IE and the known collateral IE includes determining that the connection condition exists in response to determining that the probability value exceeds the threshold value.

Further aspects include a computing device that includes a processor configured with processor-executable instructions to perform operations that may include receiving intelligence data that includes at least one of an image, sound recording, biometric information, or communication transaction information, determining whether a connection condition exists between a known target information element (IE) and a known collateral IE based on the received intelligence data, and generating and transmitting an alert message identifying an existence of a potential security threat in response to determining the connection condition exists between the known target IE and the known collateral IE.

In an aspect, the processor may be configured with processor-executable instructions to perform operations further including determining whether the received intelligence data includes an element of interest (EOI), generating or updating an EOI IE that characterizes the EOI in response to determining that the received intelligence data includes an EOI, determining whether the generated EOI IE matches a known IE stored in a list of known elements, and classifying the EOI IE as the known target IE or the known collateral IE in response to determining that the generated EOI IE matches at least one known IE stored in the list of known elements.

In a further aspect, the processor may be configured with processor-executable instructions to perform operations further including determining a first location and a first location time value for the EOI IE, comparing the first location to location information associated with each of the known IEs stored in the list of known elements to generate comparison results, using the comparison results to determine whether the first location is within a predetermined distance of a second location associated with a second IE stored in the list of known elements, identifying a second location time value associated with the second IE in response to determining that the first location is within the predetermined distance of the second location associated with the second IE stored in the list of known elements, determining whether a difference between the first location time value and the second location time value exceeds a threshold time value, incrementing a number of contacts value in response to determining that the difference between the first location time value and the second location time value does not exceed the threshold time value, and wherein determining whether the connection condition exists between the known target IE and the known collateral IE includes determining whether the number of contacts value exceeds a max contacts threshold value, and determining that the connection condition exists in response to determining that the number of contacts value exceeds the max contacts threshold value.

In a further aspect, the processor may be configured with processor-executable instructions to perform operations further including determining a communications value that identifies a number of communications within a predefined amount of time between the EOI and an element characterized by the second IE, and incrementing the number of contacts value by the determined communications value prior to determining whether the number of contacts value exceeds the max contacts threshold value.

In a further aspect, the processor may be configured with processor-executable instructions to perform operations further including determining whether the second IE is classified as a target or collateral, wherein the operation of identifying the second location time value associated with the second IE is performed in response to determining that the second IE is classified as the target and the EOI IE is classified as the known target IE, determining that the second IE is classified as the target and the EOI IE is classified as the known collateral IE, or determining that the second IE is classified as the collateral and the EOI IE is classified as the known target IE. In a further aspect, the processor may be configured with processor-executable instructions to perform operations such that generating or updating the EOI IE that characterizes the EOI includes generating or updating the EOI IE to include a location value, a time value, and one of incident data or a distinguishing feature value.

In a further aspect, the processor may be configured with processor-executable instructions to perform operations such that classifying the EOI IE as a known target element or a known collateral element includes classifying the EOI IE as the known target element. In a further aspect, the processor may be configured with processor-executable instructions to perform operations such that generating or updating the EOI IE that characterizes the EOI further includes generating or updating the EOI IE to include a list of contemporaneously identified collateral IEs.

In a further aspect, the processor may be configured with processor-executable instructions to perform operations such that determining whether the connection condition exists between the known target IE and the known collateral IE includes determining a number of contacts value based on contact information associated with the known target IE, contact information associated with the known collateral IE and contact information associated with a second known collateral IE, determining whether the number of contacts value exceeds a max contacts threshold value, and determining that the connection condition exists in response to determining that the number of contacts value exceeds the max contacts threshold value. In a further aspect, the processor may be configured with processor-executable instructions to perform operations further including monitoring movements, communications, or activities a known target characterized by the known target IE over a period of time, generating a behavior IE that characterizes movements, communications, or activities of the known target, determining a probability value that indicates a likelihood that the known target will approach a known collateral characterized by the known collateral IE, and determining whether the probability value exceeds a threshold value, wherein determining whether the connection condition exists between the known target IE and the known collateral IE includes determining that the connection condition exists in response to determining that the probability value exceeds the threshold value.

Further aspects may include a computing device that includes a processor configured with processor-executable instructions to perform various operations corresponding to the methods discussed above. Further aspects may include a computing device that includes various means for performing functions corresponding to the method operations discussed above. Further aspects may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 5A is a display on a client device illustrating a plurality of alert messages, suitable for use with various embodiments.

DETAILED DESCRIPTION

Figure 1:
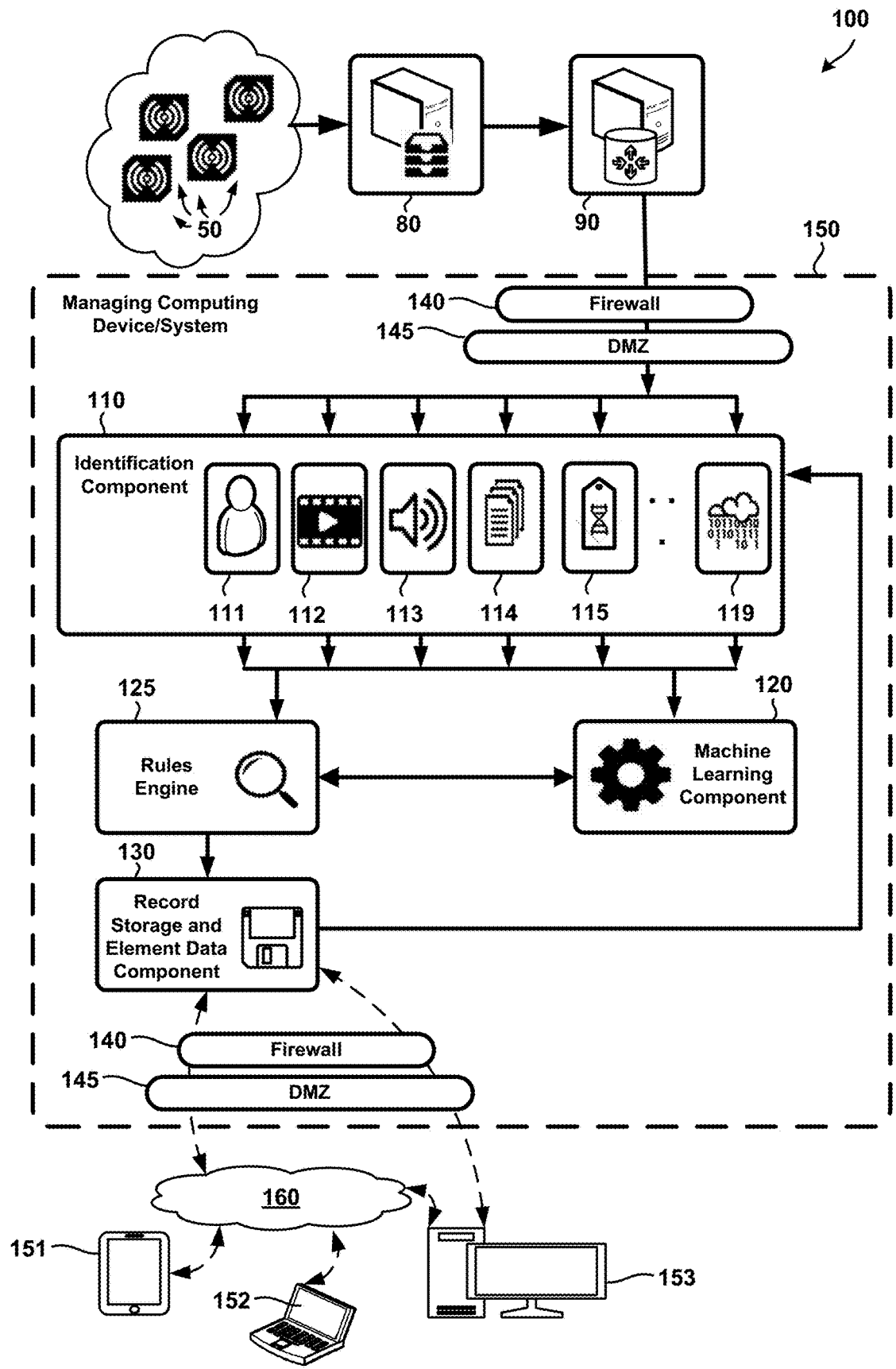
FIG. 1 is schematic diagram illustrating various components and communication links in an environment that includes one or more computing devices configured to detect potential security threats, suspicious behaviors or notable human activities in accordance with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments may include systems, methods, and computing devices configured detect potential security threats, suspicious behaviors or notable human activities. In particular, the systems and computing devices may use an artificial intelligence-based method that applies pattern recognition and cognitive analysis to monitor, analyze, and notify organizations of designated human activities, including risks and potential security threats. In this way, various embodiments determine and/or acquire actionable knowledge through a rules-based analysis of intelligence data. The embodiments may generate and transmit alert messages that include the actionable knowledge to the appropriate agencies or high level decision making entities.

In some embodiments, a computing device may be configured to use artificial intelligence and apply pattern recognition and cognitive analysis to detect a potential security threat. A processor in the computing device may be configured to collect or receive intelligence data (e.g., images, sound recordings, biometric information, etc.), use artificial intelligence, pattern recognition, cognitive analysis, etc. to identify elements in the intelligence data, determine the relative importance of the identified elements, determine that an identified element is an element of interest, generate an information element that characterizes the element of interest, and classify the information element as a known target or known collateral in response to determining that the element of interest corresponds to a known element stored in a list of known elements. The processor may use artificial intelligence, pattern recognition, cognitive analysis, or other similar techniques to determine whether a connection condition exists between the element of interest and any of the known targets or known collaterals included in the list of known elements. The computing device may generate and transmit an alert messages that includes actionable knowledge (e.g., connection condition information, etc.) to the appropriate agencies or high level decision making entities in response to determining that a connection condition exists.

By using artificial intelligence, pattern recognition, cognitive analysis, and other techniques to analyze massive amounts of data to identify a pivot or an element of interest (EOI) and determine whether a connection condition exists between the pivot/EOI and known targets/collateral, the various embodiments improve the performance and functioning of surveillance and intelligence collection/analysis systems. For example, the various embodiments may analyze data (e.g., sensor data, document data, etc.) received from disparate and often incompatible sensors and systems, identify and measure notable similarities between entities in different data sets, determine the contacts and associations between entities, identify pivotal elements, use identified pivots to identify suspicious behaviors and patterns, and automatically notify the appropriate agencies of suspicious behaviors and patterns. These operations allow the various embodiments to provide technical solutions that overcome multiple long-standing and well-known technical problems within surveillance and intelligence collection/analysis systems.

Various embodiments may have application for law enforcement, as well as any human activity monitoring circumstances, such as for tracking employees, inmates in penitentiaries, students in schools, large crowds, public venues, and other locations humans visit, pass-through, or spend time. The various embodiments may also have application for facility security, such as checkpoint metrics (how fast lines moving, are people cutting, and/or what people are passing through the checkpoint), perimeter security, known or suspected terrorist detection, employee tracking, or law enforcement activities. In addition, various embodiments may be used at penitentiaries, schools, hotels, mass transit or other transportation systems, amusement parks, sports, entertainment, or other leisure venues, and any locations people visit, pass-through, or spend time. Also, various embodiments may be used for counterintelligence, including insider threat and counter surveillance activities. Further still, various embodiments may be used for access control, such as multi-factor authentication or identification/verification.

The term "computing device" is used herein to refer to any one or all of cellular telephones, smart-phones, web-pads, tablet computers, Internet enabled cellular telephones, wireless local area network (WLAN) enabled electronic devices, laptop computers, dedicated healthcare electronic devices, personal computers, server computing devices, and similar electronic devices equipped with at least a processor and configured to communicate with other computing devices described herein.

As used herein, the terms "information element" and "element" may be used interchangeably to refer to an information structure or unit of information that characterizes or represents a creature, object, or place. Each element may include, or may be associated with, one or more identifiers, data types, categories, activity/behavior information, characterization information, feature information, risk level information, color scheme information, color coding information, confidence values, and other similar values, parameters and information fields that are suitable use in identifying, monitoring, analyzing, modeling, characterizing, or representing the creature, object, or place. As examples, an information element may include a classification information field that stores a value (e.g., a number, symbol, string, etc.) identifies its associated categories, location fields/values that indicate that a creature or object was at a particular location, location time fields/values that identify a time that a creature or object was at a particular location, time fields/values that identify an incident time or a time that is relevant or of particular importance, various number of contacts fields/values that indicate the number of times an entity was in contact with another entity, a composite risk rating field/value, one or more feature vectors that characterize the distinctive features of the creature, object, or place, and other similar information.

As used herein, the terms "target of surveillance" and "target" may be used interchangeably to refer to a creature, object, or place that is a subject of surveillance, such as in an investigation. A target element may be information element that characterizes or represents a target.

As used herein, the terms "collateral to surveillance" and "collateral" may be used interchangeably to refer to a creature, object, or place that is secondary or subordinate in importance to a target with regard to a particular investigation or surveillance. A collateral element may be information element that characterizes or represents a collateral.

As used herein, the term "intelligence data" may refer to any information that may be used for modeling, monitoring, analyzing, evaluating, authenticating, characterizing, or representing an action, activity, behavior, event, entity, object, or place. As examples, intelligence data may include images (e.g., of a creature, object, place, etc.), videos, communication transaction information (e.g., records of phone calls and text messages, etc.), sound recordings, location information, movement information, financial transaction information, identification information, informational lists (e.g., most wanted persons list, arrest records, etc.) and/or any other information that may be collected by a sensor or an organization in accordance with the various embodiments.

As used herein, the terms "known element" and "known target information element" may be used interchangeably to refer to an information element that characterizes or represents a previously identified creature, object, or place that is recorded and made available to the system. For example, a known element may characterize or represent a previously identified individual, such as a recognized criminal, law enforcement personnel, employee, staff, student, or anyone whose identity has been recorded and made available to the system. As further examples, known elements may include previously identified buildings, locations or areas, coordinates, and other similar entities. Known elements may include ordinary or common elements (e.g., a briefcase, jacket, car, gun, etc.), as well as more unique elements (e.g., a specific type of briefcase, a specific person, etc.). A known element may include one or more information fields and values, such as a classification information field that stores a value (e.g., a number, symbol, string, etc.) that identifies its associated categories.

The various embodiments include computing devices having processors that are configured with processor executable instructions to generate and update known elements based on intelligence data. The processors may be configured to add or include the known elements to a list or database of known elements.

The processor may classify the known elements into one or more distinct categories. These categories may include "target," "collateral," "pivot," and the like. For example, targets that considered particularly suspect or otherwise important to surveillance activities may be classified by a processor as a "pivot." There may be more than one target labeled as such in the database or list of targets. A known element that is classified into the pivot category may be referred to herein as a "pivot" or "pivotal element."

In some embodiments, the processors may be configured to classify the known elements into one or more sub-categories categories. For example, within the category of collateral, there may be further categories and distinctions, such as for low-risk or "safe" individuals (e.g., law enforcement personnel or trusted employees) versus individuals for whom little information is available. In addition, known elements may be categorized and differentiated by a risk level (e.g., high, medium, low, etc.) associated with a particular known element. Known elements may be further categorized/differentiated via a color scheme (e.g., red, orange, yellow, green categories), which may also be used to improve user interface visual differentiation between known elements when presenting information to users.

In some embodiments, the processors also may be configured to classify the known elements into more granular categories, with additional colors or using a numbering system or sliding scale. In addition, known elements may be designated at one of the various levels denoting a relative risk level. For example, element of interest (EOI) or persons of interest (POI's), such as known or suspected terrorists (KST's), may be designated as "Red," while low threat elements (e.g., ones that represent law enforcement or trusted employees) may be designated as "Green," and all other elements may be designated as "Yellow." From time-to-time, individuals, objects, or locations may have their risk level changed based on circumstances. Also, unknown individuals (i.e., Yellow) may have more flexible designations (i.e., more easily changed to Red) than a Green individual.

In some embodiments, the processors also may be configured to collect and/or receive or collect intelligence data, and determine whether the intelligence data includes a creature, object, or place that is of interest to a particular surveillance. A creature, object, or place that is of interest to a particular surveillance is referred to herein as an element of interest (EOI). The processors may determine whether the intelligence data includes an EOI by performing various operations to implement and use the various technologies and techniques discussed in this application, such as artificial intelligence, machine learning (e.g., classifiers that include decision node, behavior vectors, etc.), image processing and analysis, computer vision, pattern recognition, cognitive analysis, etc.

In some embodiments, the computing device may be equipped with a sensor that captures images or frames. A processor of the computing device may be configured to collect information from the sensor, identify prominent objects or features within the images or frames, and determine whether the identified feature is an element of interest. The processor may also estimate the dimensions and scale of the identified features in the image, compare the identified features to each other and/or to features in images of known elements stored in the database, and identify correspondences based on the comparison. Each correspondence may be an information structure that identifies the probability that a feature (or feature point) in a first frame/image is the same feature in a second image. The processor may compare the probability value to a threshold value, and determine that the intelligence data (e.g., the captured images/frames) includes an element of interest in response to determining that the probability value exceeds the threshold value.

The processor may then equate the element of interest to a known target element or a known collateral element, and determine whether a connection condition exists between the element of interest and a known target element. For example, if the element of interest is classified or equated to a known collateral, the processor may determine whether a connection condition exists between the element of interest and a known target element. If the element of interest is classified or equated to known target, processor may determine whether a connection condition exists between the element of interest and a known collateral element and/or with other targets.

FIG. 1 illustrates a schematic view of various components and communication links in a system 100 that includes one or more computing devices configured to detect and respond to potential security threats, suspicious behaviors or notable human activities in accordance with the various embodiments. In the example illustrated in FIG. 1, the system/system 100 includes a plurality of intelligence data collection source components 50, a data gathering component 80, a content router component 90, one or more managing computing devices 150, a plurality of client devices 151, 152, 153, and a communication network 160.

The managing computing device 150 may include an identification component 110, a machine learning component 120, a rules engine 125, a record storage and element data component 130, a firewall component 140, and a demilitarized zone (DMZ) component 145. The identification component 110 may include a still image component 111, a video component 112, a sound component 113, a text component 114, a biomarker usage component 115, a previously analyzed data component 119, and other similar specialized components configured to perform a specific set of processing and analysis operations. Any or all of these components may be included in a single computing device/system or spread across multiple computing devices/systems. Through communications, either directly or indirectly through the communication network 160, the managing computing device 150 and/or its constituent components may be accessed by applications running on the client devices 151, 152, 153.

In some embodiments, the system may also include a list or database of known elements (not illustrated separately in FIG. 1). The system 100 may be configured to continuously or repeatedly evaluate and update the list of known elements based on the results of its analysis operations. For example, the system 100 may reclassify a known element classified as collateral (or a collateral element) as a pivot (or a pivotal element) based on the results of the analysis. In some embodiments, the list/database of known elements may be included as part of the record storage and element data component 130.

As mentioned above, each of the known elements may be an element or information structure that characterizes or represents one of a creature (i.e., person or animal), object, or place. As an example, a known element may include, identify, characterize and/or represent a previously identified individual, such as recognized criminals, law enforcement personnel, employees, staff, students, or others whose identity is recorded and made available to the system.

Various embodiments aggregate and compile various forms of information from intelligence data collection sources 50 for performing cognitive analysis. Such intelligence data may be aggregated from images (i.e., still or video) or audio segments. The images or audio segments may be compiled in real-time (i.e., live) and/or received from an archive. In addition, the intelligence data may include documentation gathered from and collected by one or more law enforcement agencies (e.g., FBI, CIA, DEA, ATF, etc.). For example, a law enforcement agency's "most-wanted" or "persons of interest" lists may identify individuals known or suspected of significant wrong doing. Further, numerous sources may provide biomarker usage information, which are often used as a pass-key or identity. Biomarkers may include distinctive biological or biologically derived indicators of an individual's identity and may tie a particular individual to a place where the biomarker was used. For example, a finger print scan (e.g., Touch ID), palm scan, retinal scan, and/or voice recognition device may provide biomarker usage data.

The intelligence data collection sources 50 may be located in a single location or in numerous locations. For example, cameras and microphones distributed in one or more metropolitan areas may be used to look for, monitor, and/or track targets and collateral elements. With the proper authorization, cameras and/or microphones may collect intelligence data from schools, hotels, mass transit or other transportation systems, amusement parks, sports venues, entertainment venues, other leisure venues, and any locations people visit, pass-through, or spend time. Additionally, individuals often use biomarkers as passwords or passkeys to open locks or gain access to computing devices or facilities. When an individual uses a biomarker in this way, the occurrence may register and be reported as intelligence data. For example, when individuals use a retina scan, palm scan, or fingerprint scan (e.g., Touch ID on a smartphone), the event may be registered and the intelligence data supplied to one or more managing computing devices 150, in accordance with various embodiments.

The data gathering module 80 may perform an early evaluation of received intelligence data in order to identify collected elements within the received intelligence data. For example, the data gathering module 80 may perform facial, object, or location recognition (i.e., identification) on video or still images. Similarly, voices, key-phrases, or distinct sounds may be identified by the data gathering module 80 from audio sources. Each of the identified faces, objects, locations, voices, phrases, and/or distinct sounds may be a collected element used in various embodiments for matching against known elements.

The content router 90 may direct particular information gathered by the data gathering module 80 to the one or more managing computing devices 150, and particularly an appropriate identification module 110 or an appropriate subsystem within the identification module 110. For example, identification module 110 may be configured to handle separately different types of data, such as still images 111, videos 112, sounds 113 (i.e., audio-only recordings or audio included in video), text 114, biomarker usage 115, previously analyzed data 119, and other types of information as appropriate. Alternatively, different identification modules 110 may handle each of the different types of data.

The different types of data may be distinguished by the type of analysis that must be done to the data for matching collected elements identified in the data with known elements. For example, the videos 112 may be analyzed frame-by-frame, and the individual frames may be analyzed like the still images 111 for facial, object, or location recognition. Facial recognition may be used to match individuals to known individuals. Similarly, object recognition may be used to match identified objects to known objects, such as weapons, explosives, vehicles, articles (e.g., bags, cases, backpacks), materials or compounds (e.g., fertilizer or controlled substances). As a further example, the sounds 113 from audio-only recordings or the audio included in the videos 112 may be analyzed for voice recognition or other recognizable sounds.

The identification module 110 may match collected elements identified in intelligence data to known elements. Each of the known elements may be associated with one of a creature (i.e., person or animal), object, or place. The matching of collected elements may initially classify the collected elements as one of three types of elements; namely a creature, object, or place. Once the collected elements are classified, the matching of collected elements may also include identifying individual ones of the collected and categorized elements. In this way, the identification module may equate creatures (i.e., persons, animals, or other living things), objects, or places with a unique name of that creature, object, or place. For example, known elements may include one or more previously identified individuals, like recognized criminals, law enforcement personnel, employees, staff, students, or others whose identity is recorded and made available to the one or more managing computing devices 150. As a further example, known elements may include numerous ordinary or common objects, as well as more unique objects. As yet a further example, known elements may include buildings, areas, specific coordinates, or other locations. Thus, matching collected elements identified in intelligence data may associate a particular name or other identifier to known creatures, objects, or places. In the event that an identified creature, object, or place may not be equated with a name or identifier known from previously compiled data, that creature, object, or place may be assigned a unique identification code and labeled, "unknown." Subsequent identifications of previously identified, but unknown, creatures, objects, or places may be associated with the assigned unique identification code. If the identity of a previously identified, but unknown, creature, object, or place becomes subsequently known, the identification module 110 may update the record storage and element data farm 130 for that particular creature, object, or place.

The known elements used by the identification module 110 may include at least two distinct categories of known elements. In particular, one category of known elements may be targets of surveillance, such as in an investigation, which may also be referred to as a "pivotal element" or just a "pivot." One or more individuals considered particularly suspect or otherwise important to surveillance activities may be labeled a target (i.e., a pivot). There may be more than one target labeled as such. Each target may be an individual (i.e., a creature), an object, or a place. In contrast, another category of known element may be a collateral element. Collateral elements are subordinate in significance to targets with regard to a particular investigation or surveillance activity. Within the category of collateral elements, there may be further distinctions, such as low-risk or "safe" individuals (e.g., law enforcement personnel or trusted employees) versus individuals for whom little information is available.

In various embodiments, the known elements may be distinguished by more than two categories. In particular, the distinguishing categories may be differentiated by a risk level associated with a particular known element. A high, medium, and low risk level may be the basis of three categories of known elements. In addition, color schemes (e.g., red, yellow, green) may be used to improve user interface visual differentiation between known elements when presenting information to users. Alternatively, the distinguishing categories may be more granular, with additional colors or using a numbering system or sliding scale. In this way, individuals may be designated at one of the various levels denoting a relative risk level. For example, persons of interest (POI's), such as known or suspected terrorists (KST's), may be designated as "Red," while low threat people like law enforcement or trusted employees, may be designated as "Green," and everyone else may be designated as "Yellow." From time-to-time, individuals, objects, or locations may have their risk level changed based on circumstances. Also, unknown individuals (i.e., Yellow) may have more flexible designations (i.e., more easily changed to Red) than a Green individual.

The identification module 110 may provide or make available the collected elements that were matched to known elements to a machine learning engine 120 and a rules engine 125. The machine learning engine 120 may use computational statistics, which also focuses on prediction-making through probabilities. In this way, the machine learning module 120 may identify (i.e., "learn") a baseline behavioral profile or behavior vector for various entities, which may be used by the rules engine 125 to identify meaningful threats and assess levels of risk.

The machine learning engine 120 may further data mine the data processed by the identification module 110, looking for patterns beyond matching collected elements to known elements. In addition, the machine learning module 120 may autonomously make predictions (i.e., unsupervised learning) and/or apply user input that influences or overrides the predictions (i.e., supervised learning). Unsupervised learning may compare identified activities to known patterns of behavior. Supervised learning techniques may be used to reduce the number false positives (i.e., false alarms). For example, the machine learning module 120 may monitor activities to determine a pattern, compare the determined pattern to known patterns, determine whether the determined pattern(s) is/are consistent with risky or threatening activity, and classify the activity as abnormal, suspicious, or risky in response to determining that the activities are risky or threatening. The machine learning module 120 may send the collected behavior information (or information identifying the risky or threatening behaviors) to the rules engine 125 or a user (e.g., a human data analyst) for further evaluation. In this way, the rules engine 125 and/or the user may determine whether the identified activities are benign or non-benign, label or categorize the identified activities, and update the known patterns of benign and non-benign behaviors used by the machine learning engine 120. Thus, the machine learning module 120 may then use this updated information (e.g., labels, patterns, etc.) to more accurately classify benign or non-benign human activity and more accurately determine a risk level that should be assigned to known elements. The machine learning module 120 may thus "learn" new behavior patterns over time, which may improve the accuracy of the notable human activity detection solutions, and significantly reduces the number of false positives over time.

The rules engine 125 is a processor-based system that executes one or more instructions for making decisions through the evaluation of alternatives. The rules engine 125 may consider various policies, some of which may conflict, as well as other operational rules to make determinations based on a comparison or evaluation of the alternatives. The rules engine 125 may include suitable storage space (i.e., memory) for executing one or more web/software server applications and or client applications. The rules engine 125 may be configured to present various combinations of resources, capabilities, and functionalities to other servers or the plurality of client devices 151, 152, 153, such as web application services or web-based requests, in a manner that encourages the detection of notable human activity.

The rules engine 125 may determining whether a connection condition exists between a target of surveillance and a collateral element of that surveillance in the received intelligence data. For example, the rules engine 125 may determine a connection condition exists in response to the target and the collateral element being identified either within a predetermined distance of one another (e.g., within 100 yards/meters) or in communication with one another. In addition, the rules engine 125 may determine a connection condition exists in response to the target and the collateral element previously being identified a threshold number of times (e.g., 2-5 times) either within the predetermined distance of one another or in communication with one another. As a further example, the rules engine 125 may determine a connection condition exists in response to the target and a predetermined number (e.g., 2-3) of other collateral elements being identified either within a predetermined distance of one another or in communication with one another. Additionally, the rules engine 125 may determine a connection condition exists in response to another collateral element being identified either within another predetermined distance (e.g., 50 yards/meters) of or in communication with the target and the collateral element. As yet a further example, the rules engine 125 may use a mathematical function to determine whether a connection condition exists. The mathematical function may use individual risk ratings maintained for each target and each collateral element. In this way, the rules engine 125 may determine a connection condition exists in response to a composite rating of both the target and the collateral element being above a rating threshold, wherein the composite rating is based on a risk rating of each of the target and the collateral element.

For creatures, connection conditions may be found linking a creature to one or more other creatures, one or more objects, and one or more locations. Similarly for objects, connection conditions may be found linking an object to one or more creatures, one or more other objects, and one or more locations. Connection conditions linking a creature to another creature or an object, as well as connection conditions linking an object to another object or a creature, may also be associated with at least one particular location. If the creatures and/or objects physically meet or are in close proximity to one another, the association will be with one particular location. In contrast, if two or more individuals communicate from remote locations, then each individual may be associated with the respective location from which they did the communicating. While two or more locations may have connection conditions, they may be limited to circumstances involving communications or transportation of goods or people between those locations.

The record storage and element data farm 130 may record and compile analyzed intelligence data, including the collected elements identified in intelligence data and matched to known elements. In addition, the record storage and element data farm 130 may record connection conditions between targets and collateral elements determined by the rules engine 125. In particular, the rules engine 125 may store determination results in the record storage and element data farm 130, which may also be fed back to the identification module 110 for a more refined subsequent round matching. In addition, the record storage and element data farm 130 may store the data that is provided to the plurality of client devices 151, 152, 153 with alert messages in response to determining a connection condition exists between the target and the collateral element.

The firewall 140 may include a network security system designed to prevent unauthorized access to or from the one or more managing computing devices 150, such as unauthorized Internet users. Thus, all data or communications entering or leaving the one or more managing computing devices 150 may pass through the firewall, which examines each message and blocks those that do not meet the specified security criteria.

The DMZ 145 (also known as a perimeter network) may be a physical or logical sub-network that contains and exposes an organization's external-facing services to an untrusted network, usually a larger network such as the Internet. The DMZ 145 and the firewall 140 may be any well-known security components that are standard equipment used to protect networks and computing systems (e.g., 101).

The communication network 160 may provide access to other intelligence data collection sources, data gathering components, and content routers over the same or another wired and/or wireless communications connection. Also, the communication network 160 may provide a communication link between the one or more managing computing devices 150 and the client devices 151, 152, 153. The one or more managing computing devices 150 and the client devices 151, 152, 153 may be configured to communicate with each other for exchanging various types of communications and data.

The one or more managing computing devices 150 may include standard network appliance, router and/or interface components used to receive incoming data packets from remote computing devices, direct incoming data packets to the addressed client devices 151, 152, 153 either directly or via the communication network 160, and receive outgoing data packets from client devices 151, 152, 153 either directly or via the communication network 160.

The intelligence data collection source components 50 may include a processor, communication circuitry, and/or one or more sensors for collecting, processing and communicating various forms of intelligence data. The intelligence data collection source components 50 may include, or may communicate with, any mechanical, optical, electrical or magnetic sensor known in the art. Example sensors include image sensors (e.g., video camera, monocular sensor, etc.), microphones, infrared sensors, heat sensors, biological sensors, bioinformation sensors, chemical sensors, spectroscopy sensors, geophysical sensors, motion sensors, accelerometers, magnetometers, etc.

In some embodiments, the intelligence data collection source components 50 may be configured to receive, capture, intercept, or otherwise collect intelligence data from external or third-party organizations or agencies. For example, one or more of the intelligence data collection source components 50 may be configured to receive intelligence data from one or more law enforcement agencies (e.g., FBI, CIA, DEA, ATF, etc.). The intelligence data may include documentation and information gathered from and collected by the law enforcement agencies, such as a "most-wanted" or "persons of interest" lists that identifies individuals known or suspected of significant wrong doing.

The intelligence data collection source components 50 may process and send the received, collected and/or generated intelligence data to the data gathering component 80.

The data gathering component 80 may be configured to perform an early evaluation of received intelligence data in order to identify collected elements within the received intelligence data, and generate collected element information structures that each represent or characterize an identified collected element. For example, the data gathering component 80 may perform facial, object, or location recognition (i.e., identification) on video or still images received from one or more of the data collection source components 50 in order to identify collected elements. Similarly, the data gathering component 80 may identify voices, key-phrases, or distinct sounds from audio information received from one or more of the data collection source components 50. The data gathering component 80 may generate collected element information structures that represent or characterize each of the identified faces, objects, locations, voices, phrases, and/or distinct sounds. The collected element information structures may be used in various embodiments for comparing or matching collected elements with known elements (e.g., a known or previously analyzed/classified face, voice, object, location, sound, etc.).

The data gathering component 80 may aggregate and process the intelligence data, and send the results to the content router 90. The content router 90 may be configured to direct the information gathered or generated by the data gathering component 80 to the one or more managing computing devices 150, and particularly an appropriate identification component 110 or an appropriate sub-system within the identification component 110. For example, identification component 110 may be configured to handle separately different types of data, such as still images, videos, sounds (i.e., audio-only recordings or audio included in video), text, biomarker usage, previously analyzed data, and other types of information as appropriate via components 111-119. Alternatively, different identification components 110 may handle each of the different types of data. The content router 90 may be configured to identify the appropriate identification component 110 or sub-system, and send the information received from the data gathering component 80 to the identified component or sub-system.

The content router 90 may be configured to distinguish the different types of data by the type of analysis involved in matching the collected elements with known elements. For example, the content router 90 may determine that videos may be analyzed frame-by-frame by the video component 112, and the individual frames may be analyzed like still images for facial, object, or location recognition may be analyzed by the still image component 111. The content router 90 may distinguish between these different types of data and available analysis systems, and direct the information to the most appropriate component in the system 100.

The identification component 110 may be configured to match collected elements identified in the received intelligence data to known elements. As part of the matching operations, the identification component 110 may initially classify the collected elements into one of a creature element type, an object element type, or a place element type. Once the collected elements are classified, the identification component 110 may identify individual instances of the collected and categorized elements. The identification component may equate creatures (i.e., persons, animals, or other living things), objects, or places with a unique name of that creature, object, or place. For example, the identification component 110 may be configured to use facial recognition to match individuals to known individuals. Similarly, object recognition may be used to match identified objects to known objects, such as weapons, explosives, vehicles, articles (e.g., bags, cases, backpacks), materials or compounds (e.g., fertilizer or controlled substances). As a further example, the sounds from audio-only recordings or the audio included in the videos may be analyzed for voice recognition or other recognizable sounds.

The system 100 (or one or more of its components) may be configured to aggregate and compile the various forms of intelligence data collected or produced by the intelligence data collection source components 50 to generate information that is suitable for use in pattern recognition, cognitive analysis, machine learning, artificial intelligence (e.g., biometric artificial intelligence, etc.), image segmentation (e.g., edge/feature detection, etc.), scene reconstruction, etc. In some embodiments, intelligence data may be aggregated from images (i.e., still or video) or audio segments. The images or audio segments may be collected or compiled in real-time (i.e., live) and/or received from an archive.

In some embodiments, the system 100 may be configured to aggregate and compile different types of data collected from multiple intelligence data collection source components 50, which may be located in a single location or in numerous different locations. For example, data collection source components 50 associated with cameras and microphones may be distributed in two different metropolitan areas, and image information collected from a first component in a first metropolitan area may be combined with audio-visual information collected from a second component in a second metropolitan area to generate augmented intelligence data that is suitable for use in pattern recognition, cognitive analysis, etc.

In addition, as mentioned above, numerous sources may provide biomarker usage information, which are often used as a pass-key or identity. Biomarkers may include distinctive biological or biologically derived indicators of an individual's identity and may tie a particular individual to a place where the biomarker was used. For example, a finger print scan (e.g., Touch ID), palm scan, retinal scan, and/or voice recognition device may provide biomarker usage data. Additionally, individuals often use biomarkers as passwords or passkeys to open locks or gain access to computing devices or facilities. When an individual uses a biomarker in this way, the occurrence be reported as intelligence data to or by the intelligence data collection source components 50 or another component in the system 100. For example, when individuals use a retina scan, palm scan, or fingerprint scan (e.g., Touch ID on a smartphone), the event may be registered or logged as intelligence data, and the intelligence data may be supplied to the system 100 by the organization or agency. The system 100 may compile, aggregate, and/or combine such data with data from other sources (e.g., image data, audio data, etc.) to generate augmented intelligence data for use in pattern recognition, cognitive analysis, etc.

Figure 2:
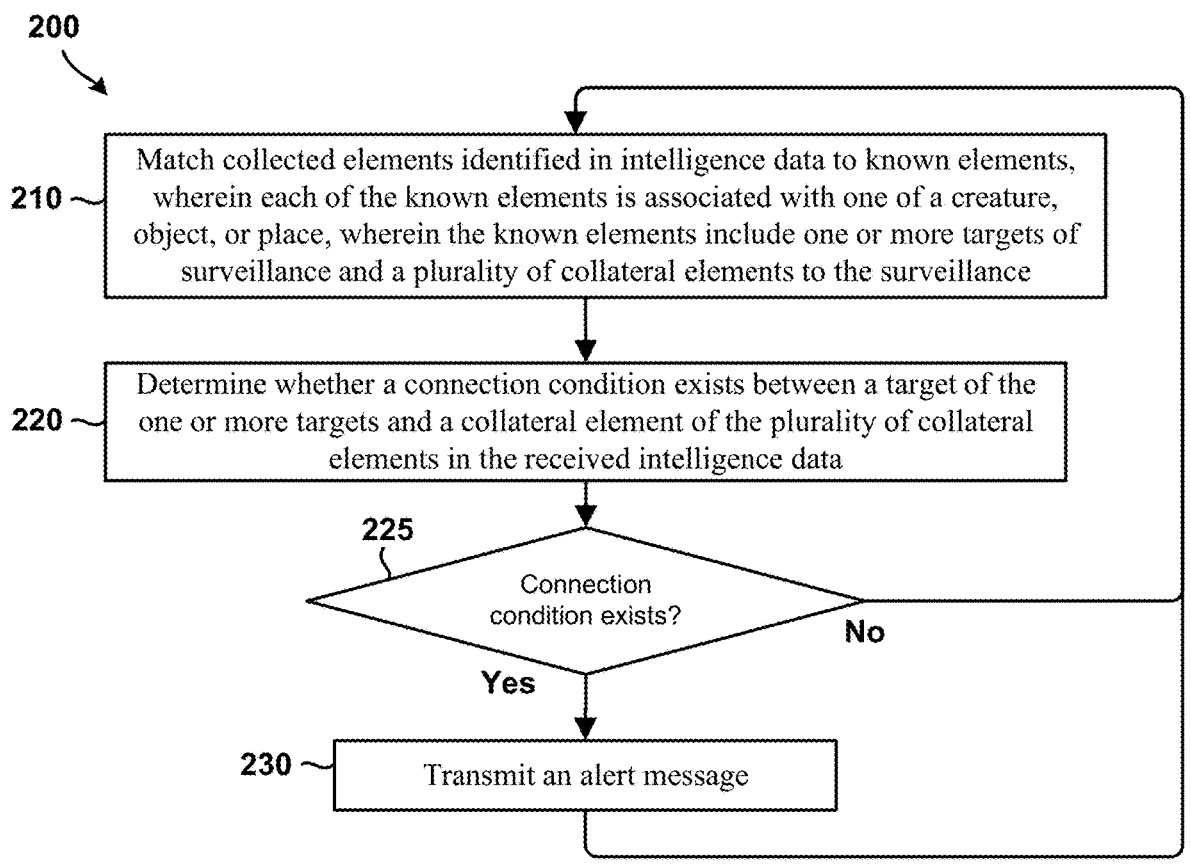
FIG. 2 is a process flow diagram illustrating a method of detecting potential security threats, suspicious behaviors or notable human activities in accordance with various embodiment.

FIG. 2 illustrates a method 200 of detecting potential security threats, suspicious behaviors or notable human activities in accordance with various embodiments. The method 200 may be performed by a processor or processing core in one or more computing devices (e.g., managing computing devices 150 illustrated in FIG. 1).

In block 210, the processor may match collected elements identified in intelligence data to known elements. In accordance with various embodiments, each of the known elements may be associated with one of a creature (e.g., a person or animal), object, or place. In addition, the known elements may include one or more targets of surveillance and a plurality of collateral elements to the surveillance. As part of these operations, the processor may receive intelligence data, determine whether the received intelligence data includes an element of interest, generate or update an element of interest information elements (EOI IE) that characterizes identified elements of interest, classify the EOI IE as a known target element or a known collateral element, and determine whether the generated EOI IE matches a known element stored in a list of known elements. In some embodiment, as part of the operations in block 201, the processor may implement and apply various statistical functions, such as a Kolmogorov-Smirnov test (KS test) that serves as a nonparametric test of the equality of continuous probability distributions, which to compare to compare two samples in the collected intelligence data.

In block 220, the processor may determine whether a connection condition exists between a target of the one or more targets and a collateral element of the plurality of collateral elements in the received intelligence data. For example, the processor may determine or compute a number of contacts value that indicates the number of times a target communicated with a collateral, the number of times that the target was in close physical proximity to the collateral, the number of times that the target and collateral passed through the same area within a predetermined amount of time, the number of times that the target was within a predetermined distance of a location associated with the collateral, a number of communications within a predefined amount of time between the element of interest and a creature, object or place characterized or represented by the collateral, etc. The processor may determine that the connection condition exists in response to determining that the determined "number of contacts" value exceeds a max contacts threshold value.

As another example, in block 220, the processor may determine a number of contacts value based on contact information associated with the EOI IE, contact information associated with the two or more known collaterals, determine whether the number of contacts value exceeds a max contacts threshold value, and determine that the connection condition exists in response to determining that the number of contacts value exceeds the max contacts threshold value.

In block 220, the processor may also activate sensors or communication circuitry to monitor the behavior (e.g., movements, communications, activities, etc.) of the EOI IE or known target over a period of time, generate a behavior information element that characterizes the behavior of the EOI IE or known target, compute a probability value that indicates a likelihood that the EOI IE or known target will approach designated collaterals, determine whether the probability value exceeds a threshold value, determine that the connection condition exists in response to determining that the probability value exceeds the threshold value. Alternatively or in addition, the processor may generate risk ratings for the EOI IE, known targets, collateral elements, generate a composite risk rating, determine whether the composite risk rating exceeds a risk threshold value, and determine that the connection condition exists in response to determining that the composite risk rating exceeds the risk threshold value.

In determination block 225, the processor may determine whether the connection condition was determined to exist in block 220. In response to determining that the connection condition exists (i.e., determination block 225="Yes"), the processor may generate and transmit an alert message in block 230. The processor may generate the alert message to include information identifying an incident, target, collateral, risks, warnings, etc., and send the alert message to the appropriate decision making entity or organization (e.g., law enforcement, system operator, facilities manager, etc.).

In response to determining that the connection condition does not exists (i.e., determination block 225="No"), or in response to transmitting the alert message, in block 230, the processor may match further collected elements identified in intelligence data to known elements, in block 210.

In some embodiments, the processor may repeat the operations of the method 200 to detect or attempt to detect potential security threats, suspicious behaviors or notable human activities. For example, the processor may repeat the operations of the method 200 until instructed to stop, such as when surveillance has concluded. As another example, the processor may repeat the operations of the method 200 for a predefined number of iterations. Thereafter, the processor may optionally repeat the operations of the method 200 at regular intervals or at other times established for doing so.

Figure 3:
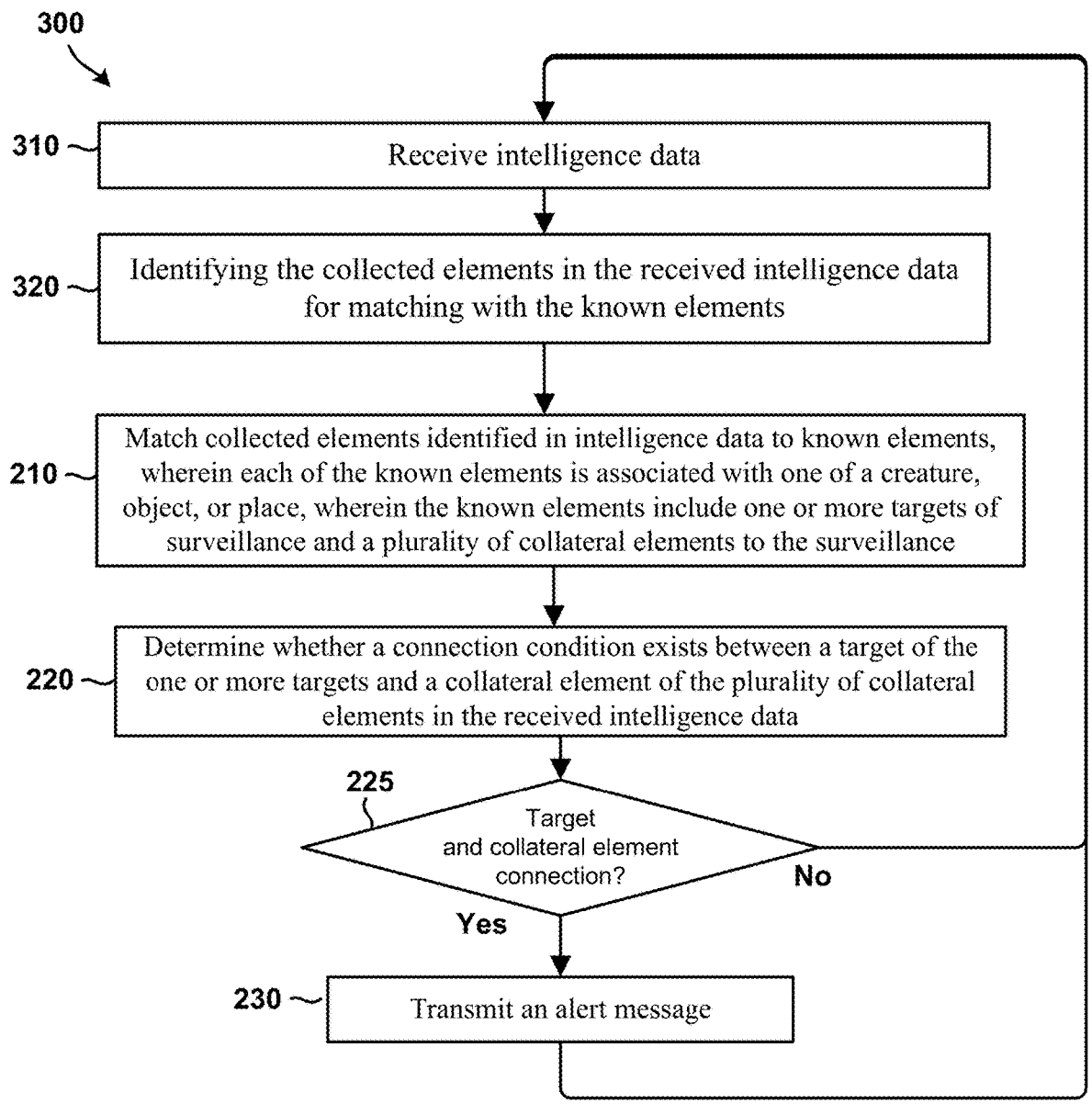
FIG. 3 is a process flow diagram illustrating another method of detecting potential security threats, suspicious behaviors or notable human activities in accordance with various embodiment.

FIG. 3 illustrates a method 300 of detecting potential security threats, suspicious behaviors or notable human activities in accordance with various embodiments. The method 300 may be performed by a processor or processing core in one or more computing devices (e.g., managing computing devices 150 illustrated in FIG. 1). In the method 300, the processor may perform operations of blocks 210, 220, and 230, and determination block 255, of the method 200 as described.

In block 310, the processor may receive intelligence data from various sources (e.g., intelligence data collection source components 50 in FIG. 1). For example, the processor may receive intelligence data from cameras, microphones, documents, records, biomarker usage, previously compiled intelligence data, and the like.

In block 320, the processor may identify the collected elements in the received intelligence data that match known elements maintained in a database and accessed by the processor. Each of the known elements may be associated with one of a creature, object, or place. For example, known elements may include one or more previously identified individuals. As a further example, known elements may include numerous ordinary or common objects, as well as more unique objects. As yet a further example, known elements may include buildings, areas, specific coordinates, or other locations.

In some embodiments, the processor may repeat the operations of the method 300 to detect or attempt to detect potential security threats, suspicious behaviors or notable human activities. For example, the processor may repeat the operations of the method 300 until instructed to stop, such as when surveillance has concluded. As another example, the processor may repeat the operations of the method 300 for a predefined number of iterations. Thereafter, the processor may optionally repeat the operations of the method 300 at regular intervals or at other times established for doing so.

Figure 4A:
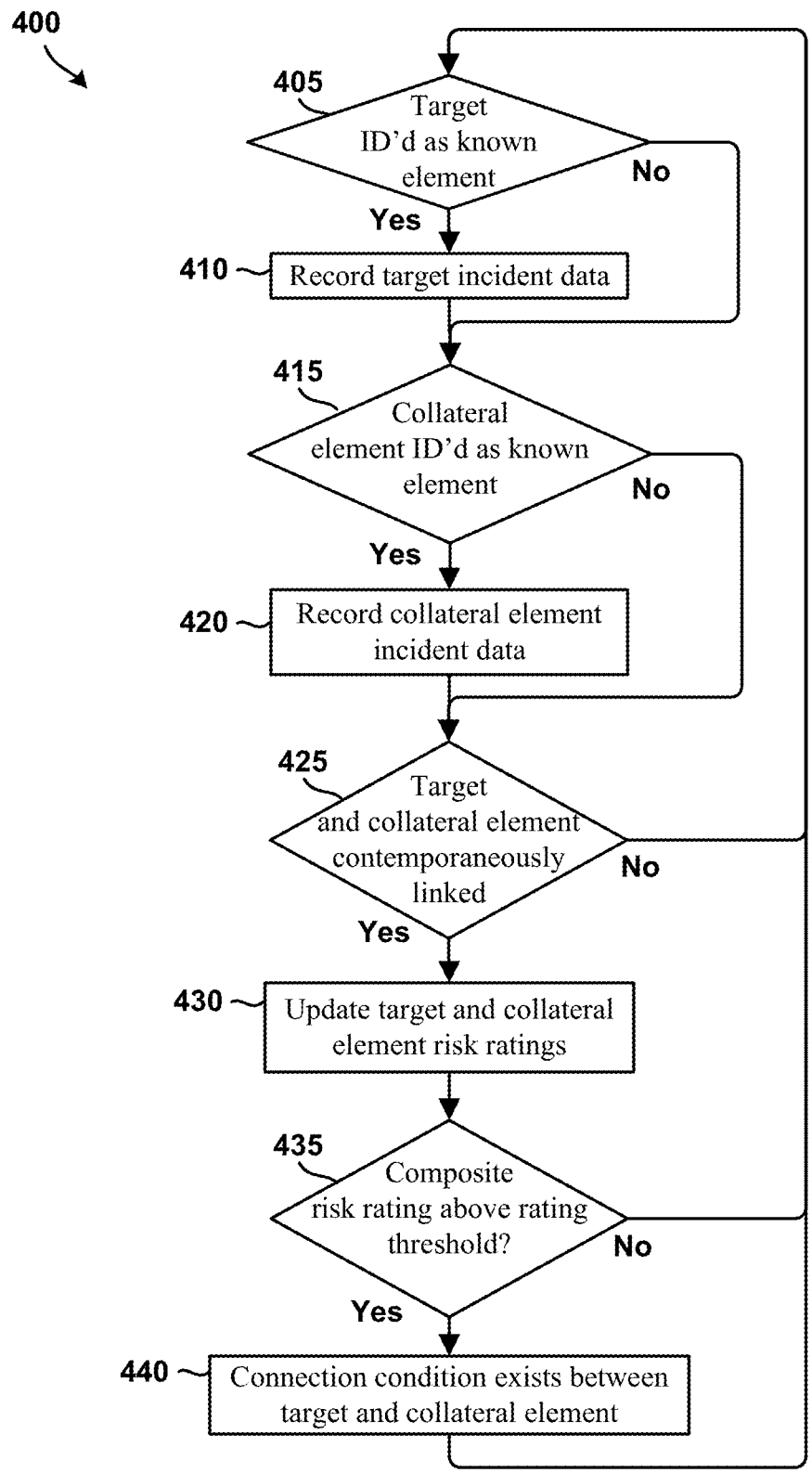
FIGS. 4A and 4B are process flow diagrams illustrating methods of detecting potential security threats, in accordance with various embodiments.

FIG. 4A illustrates a method 400 of determining whether a connection condition exists between a target and a collateral element and detecting a potential security threat in accordance with an embodiment. The method 400 is an example of the operations that may be performed in block 220 of the methods 200 and 300. The method 400 may be performed by a processor or processing core in one or more computing devices (e.g., managing computing devices 150 illustrated in FIG. 1).

In determination block 405, the processor may determine whether a target of one or more designated targets is identified as a known element in the received intelligence data (e.g., block 310 in the method 300). In response to determining that the target is identified as a known element in the received intelligence data (i.e., determination block 405="Yes"), the processor may record target incident data in block 410. For example, target incident data may include time and location information relating to where the target was identified. In addition, target incident data may include a list of collateral elements contemporaneously identified with the target. In some embodiments, the processor may generate an incident data information element based on the target incident data. In some embodiments, recording the target incident data may include generating and storing an element of interest information element or a target information element.

In response to determining that the target is not identified as a known element in the received intelligence data (i.e., determination block 405="No") or following the recordation of target incident data in block 410, the processor may determine whether a collateral element of a plurality of collateral elements is identified as a known element in the received intelligence data in determination block 415.

In response to determining that the collateral element is identified as a known element in the received intelligence data (i.e., determination block 415="Yes"), the processor may record collateral element incident data in block 420. For example, collateral element incident data (or element of interest information element, etc.) may include time and location information relating to where the collateral element was identified. In addition, collateral element incident data may include a list of targets or other collateral elements contemporaneously identified with each collateral element identified as a known element. In contrast, in response to determining that the collateral element is not identified as a known element in the received intelligence data (i.e., determination block 405="No") or following the recordation of the collateral element incident data in block 420, the processor may determine whether the target and the collateral element are contemporaneously linked in determination block 425.

The target and the collateral element may be considered to be contemporaneously linked when the two elements are in close proximity to one another or in the case of two individuals are in communication with one another. A contemporaneous link may be limited to when the target and the collateral element have previously been identified in connection conditions a threshold number of times. As another example, a contemporaneous link may exist when the target and a predetermined number of other collateral elements are identified either within a predetermined distance of one another or in communication with one another. Further, a contemporaneous link may exist when another collateral element is identified as separately being in proximity to or in communication with the target and the collateral element.

In response to determining that the target and the collateral element are contemporaneously linked (i.e., determination block 425="Yes"), the processor may update the target and collateral element risk ratings in block 430. For example, the contemporaneous link may increase the risk rating of both the target and the collateral element. Option-ally and/or additionally, the collateral element may be automatically upgraded the status of "target." In response to determining that the target and the collateral element are note contemporaneously linked (i.e., determination block 425="No"), the processor may again determine, in determination block 405, whether another target of one or more designated targets is identified as a known element in the received intelligence data or whether the same target previously identified is now identified in different received intelligence data.

Once the target and collateral element risk ratings are updated (i.e., block 430), the processor may determine whether a composite risk rating is above a rating threshold in determination block 534. The composite risk rating may be calculated based on a formula using risk rating values of each of the target and the collateral element in question. The composite risk rating may use an average, addition, multiplication, or subtraction of the two ratings in order to assess a combined risk. The rating threshold may be designed to trigger only when there is a sufficient risk or threat to warrant alerting users of the system (i.e., via a client device).

In response to determining that the composite risk rating is above the rating threshold (i.e., determination block 435="Yes"), the processor may indicate that a connection condition exists between the target and the collateral element in block 440. In response to determining that the composite risk rating is not above the rating threshold (i.e., determination block 435="No"), the processor may again determine, in determination block 405, whether another target of one or more designated targets is identified as a known element in the received intelligence data or whether the same target previously identified is now identified in different received intelligence data.

In some embodiments, the processor may repeat the operations of the method 400 to detect or attempt to detect potential security threats, suspicious behaviors or notable human activities. For example, the processor may repeat the operations of the method 400 until instructed to stop, such as when surveillance has concluded. As another example, the processor may repeat the operations of the method 400 for a predefined number of iterations. Thereafter, the processor may optionally repeat the operations of the method 400 at regular intervals or at other times established for doing so.

Figure 4B:
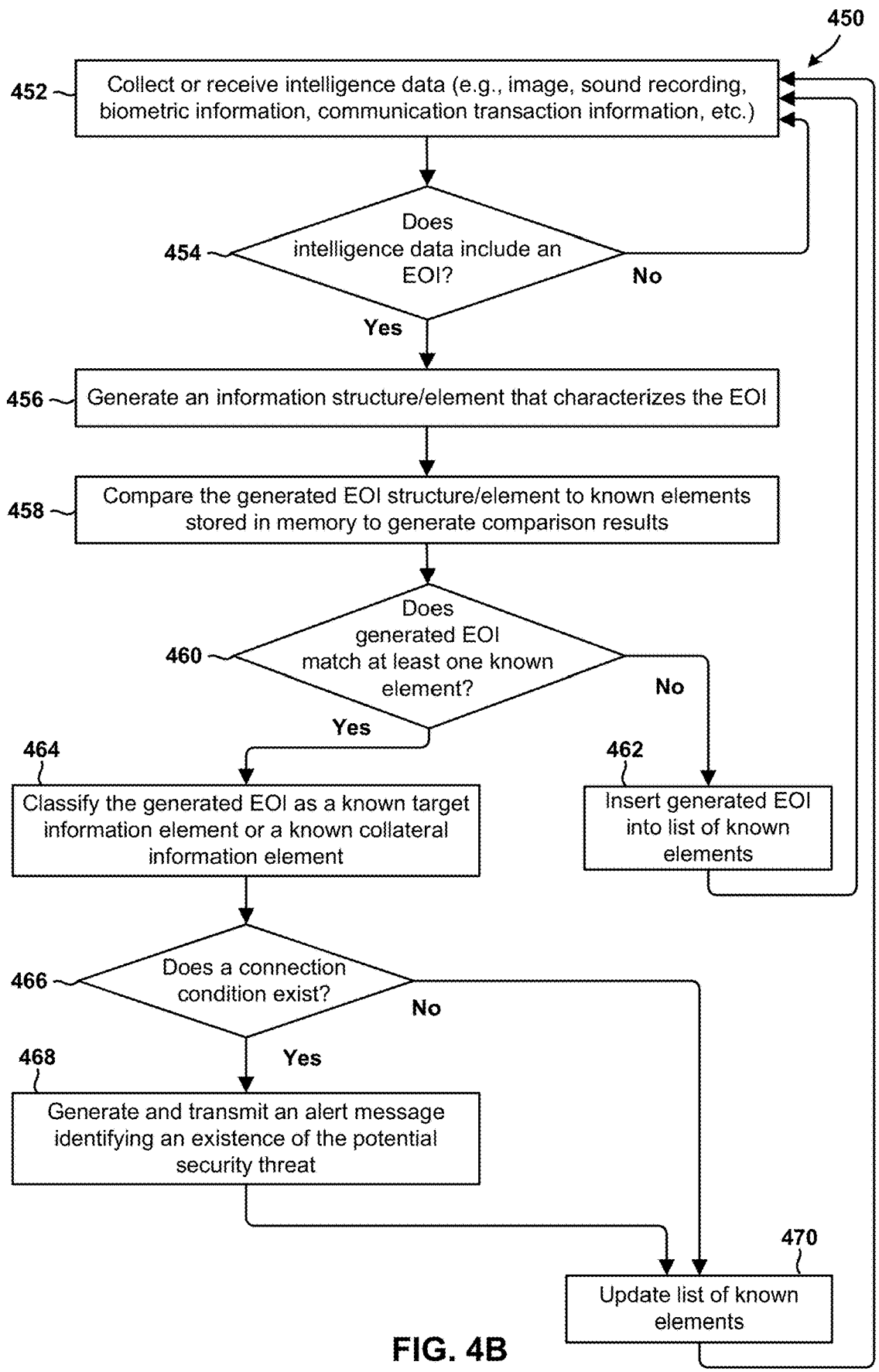

FIG. 4B illustrates a method 450 of detecting a potential security threat in accordance with an embodiment. The method 450 may be performed by a processor or processing core in one or more computing devices (e.g., managing computing devices 150 illustrated in FIG. 1).

In operation block 452, a processor in a computing device may collect or receive intelligence data (e.g., image, sound recording, biometric information, communication transaction information, etc.) from one or more sources (e.g., intelligence data collection source components 50 illustrated in FIG. 1). In determination block 454, the processor may determine whether the intelligence data includes an element of interest (EOI). In response to determining that the intelligence data does not include an element of interest (i.e., determination block 454="No"), the processor may monitor the sensors/ports to receive or collect additional intelligence data in block 452.

In response to determining that the intelligence includes an element of interest (i.e., determination block 454="Yes"), the processor may analyze the element, determine its distinguishing features, gather information about the element, and generate an information structure or an information element that characterizes many or all of the element of interest in operation block 456. The generated information structure/element may include various information fields and values, including one or more behavior vectors that each include a plurality of numerical values or symbols that collectively characterize the features and/or behaviors of the element of interest. In some embodiments, the behavior vectors may be applied to machine learning classifier models that include decision trees/stumps. The decision trees/stumps may include binary questions, test conditions and weight values. The application of a behavior vector to a classifier model may generate an analysis result that characterizes a behavior or an aspect of the element of interest.

In operation block 458, the processor may compare the generated element of interest (EOI) structure/element to known elements stored in memory to generate comparison results. In determination block 460, the processor may use the comparison results to determine whether the generated element of interest structure/element matches at least one known element stored in memory. In response to determining that the generated element of interest structure/element does not match any of the known elements stored in memory (i.e., determination block 460="No"), the processor may insert the generated element of interest structure/element into the list of know elements stored in memory (e.g., as an unknown known element, etc.) in block 462.

In response to determining that the generated element of interest structure/element matches at least one known element stored in memory (i.e., determination block 460="Yes"), the processor may classify the generated element of interest structure/element as a known target information element or a known collateral information element in operation block 464.

In determination block 466, the processor may determine whether a connection condition exists between a known target information element and a known collateral information element. In response to determining that a connection condition exists (i.e., determination block 466="Yes"), the processor may generate and transmit an alert message identifying an existence of the potential security threat for reception by the appropriate agency or decision maker. In operation block 470, the processor may update the list of know elements based on the information collected when generating or analyzing the generated element of interest structure/element, such as the existence a connection condition.

FIG. 5A illustrates a display 500, such as on a client device (e.g., 151, 152, 153) that includes a plurality of alert messages (i.e., "NOTIFICATIONS") transmitted by a processing device in accordance with various embodiments. The display 500 may show various parts of received intelligence data that have been matched to known elements. In particular, the display may include a source section 510, which shows identification information from an intelligence data collection sources, namely, "DC Cam X12345" and the owner and/or controller of that collection source, namely, "DC Field Office." The source section 510 may include additional information, such as whether the intelligence data provided is streaming live (i.e., "LIVE") or whether the intelligence data was previously recorded and now rebroadcast (i.e., "Recorded"). The word "LIVE" is indicated in bold and outlined in a rectangle to denote the intelligence data is streaming live.

The display may also include a target section 520, which displays information relating to a selected target 521. The target section 520 may include a drop-down list, search feature, or other target selection mechanism for selecting a different target. In the example shown, the target is the, "Corcoran House at Dupont Circle," which is a location, rather than an individual or object. The Corcoran House at Dupont Circle may have been selected or designated as a target for being a known or suspected to be a meeting place of other persons of interest (i.e., other targets). The target section 520 may also display last known "Location" at which the target was identified, as well as coordinates and an IP Address associated with that location. In the case in which the target is a location, the "Location" may simply be the address of that location.

Figure 5B:
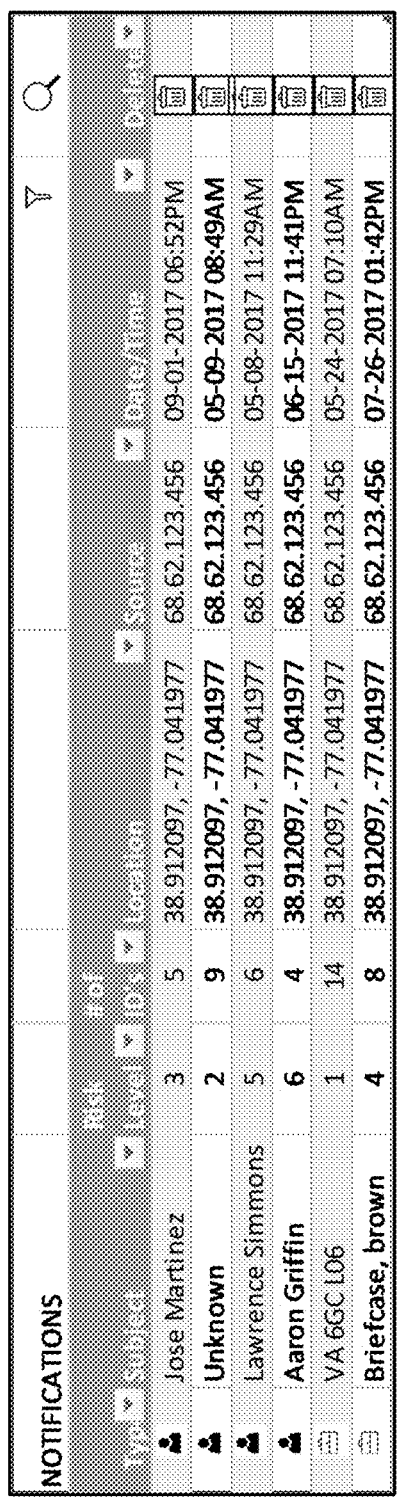
FIG. 5B is a relief view of a notifications section in the display of FIG. 5A, in accordance with various embodiments.

The display may also include a notification section 530, which includes one or more alert messages (e.g., like the transmitted message in block 230 of the methods 200 and 300). A relief view of the notification section 530 is shown in FIG. 5B. The alert messages may identify a collateral element (i.e., "SUBJECT") by type (i.e., an icon representing a person, object, or location) and name, if known. If no name is known for a collateral element, the alert message may indicate "Unknown." In addition, each alert message may identify a location associated with where the collateral element was identified (i.e., "Location"), a source from which the intelligence data was gathered (i.e., "Source"), and a time stamp associated with when the intelligence data was gathered (i.e., "Date/Time"). The Location, Source, and Date/Time information displayed may be associated with the last time (i.e., the most recent time) the collateral element was identified. Although only six collateral elements are shown, a fewer or greater number of collateral elements may be displayed. In addition, a scroll function may be provided to view additional collateral elements. The notification section 530 may include a filter feature for limiting collateral elements shown. For example, the displayed collateral elements may be limited to a particular type of collateral element (e.g., creatures, objects, or places). As another example, the collateral elements may be limited by other elements, such as name, risk level, number of identifications (# of ID's), location or the like. In addition, the notification section 530 may include a search feature for searching the database for particular collateral elements or groups thereof.

The notification section 530 may additionally include a risk level indicator (i.e., Risk Level). The risk level indicator may reflect an assessment of the particular collateral element individually or a modified risk level in associated with the selected target 521. In addition, the notification section 530 may include a number of times the collateral element has been identified ("# of ID's" in connection with the target under connection conditions with the selected target 521. This same number may also be shown as a badge-style indicator (i.e., a number in a circle in a corner of an icon or image on a display) over the representation of the corresponding collateral element in the collaterals section 550.

The display may also include a storyline section 540, which outlines in chronological order, the alert messages listed in the notification section 530. The story section may show the most recent connection conditions with the selected target 521. In addition, the connection conditions may be classified or distinguished by an incident label, such as "INCIDENT," "EVENT," or "ACTIVITY." Connection conditions may be labeled an "INCIDENT" when they involve authorities or other top-level notable events. Connection conditions may be labeled an "EVENT" when they involve a circumstance that meets a threshold composite rating score (based on the one or more collateral elements involved). Connection condition may be labeled an "ACTIVITY" as a catch-all for all connection conditions not considered either an incident or an event.

The display may also include a collateral elements section 550, which displays the most recent or most frequently recurring collateral elements associated with the select target. Four individuals and two objects are illustrated. The individuals are labeled "1," "2," "3," and "4," and the objects are labeled "5" and "6," which corresponds to the order the collateral elements are displayed in the notifications section 530. In addition, the collateral elements each include a recurrence badge, represented by the number in a circle overlapping the icon or image of the collateral element. The recurrence badge may represent the number of times the collateral element has been identified in connection with the selected target 521. The collateral element section 550 may include a filter feature for limiting collateral elements shown. For example, the displayed collateral elements may be limited to a particular type of collateral element (e.g., creatures, objects, or places). Additional filters may be included.

The various embodiments may include methods, and computing devices configured to implement the methods, of detecting potential security threats by performing operations that include receiving intelligence data, determining whether the received intelligence data includes an element of interest (EOI), generating or updating an EOI IE that characterizes the EOI in response to determining that the received intelligence data includes an EOI, determining whether the generated EOI IE matches a known IE stored in a list of known elements, and classifying the EOI IE as the known target IE or the known collateral IE in response to determining that the generated EOI IE matches at least one known IE stored in the list of known elements.

The operations may further include determining a first location and a first location time value for the EOI IE, comparing the first location to location information associated with each of the known IEs stored in the list of known elements to generate comparison results, using the comparison results to determine whether the first location is within a predetermined distance of a second location associated with a second IE stored in the list of known elements, identifying a second location time value associated with the second IE in response to determining that the first location is within a predetermined distance of the second location associated with the second IE stored in the list of known elements, determining whether a difference between the first location time value and the second location time value exceeds a threshold time value, determining a communications value that identifies a number of communications within a predefined amount of time between the EOI and an element characterized by the second IE, generating or updating (e.g., incrementing) a number of contacts value based on the communications value and/or in response to determining that the difference between the first location time value and the second location time value does not exceed the threshold time value, determining whether the number of contacts value exceeds a max contacts threshold value, determining that a connection condition exists between a known target information element and a known collateral information element in response to determining that the number of contacts value exceeds the max contacts threshold value, and transmitting an alert message in response to determining the connection condition exists between the known target information element (e.g., EOI IE, second IE, etc.) and the known collateral information element (e.g., EOI IE, second IE, etc.).

Further embodiments may include determining whether the second IE is classified as a target or collateral. In a further embodiment, the operation of identifying the second location time value associated with the second IE may be performed in response to determining that the second IE is the target and the EOI IE is the known target IE (e.g., the EOI IE was equated to the known target IE, the EOI IE is the known target IE, etc.). In some embodiments, the operation of identifying the second location time value associated with the second IE may be performed in response to determining that the second IE is classified as the target and the EOI IE is classified as the collateral IE, or vice versa.

In a further embodiment, the processor may be configured to generate or update the IE to include a location value, a time value, incident data, a distinguishing feature value and/or a list of contemporaneously identified collateral information elements. In a further embodiment, the processor may be configured to classify the EOI IE as the known target element. In an embodiment, the processor may be configured to determine whether the connection condition exists between the known target IE and the known collateral IE by determining a number of contacts value based on contact information associated with the known target IE, contact information associated with the known collateral IE and contact information associated with a second known collateral IE, determining whether the number of contacts value exceeds a max contacts threshold value, and determining that the connection condition exists in response to determining that the number of contacts value exceeds the max contacts threshold value.

In an embodiment, the processor may be configured to determine whether the connection condition exists between the known target IE and the known collateral IE by determining whether a composite risk rating of the known target IE and the collateral element exceed a rating threshold. In an embodiment, the processor may be configured to collect behavior information by monitoring movements, communications, or activities a known target characterized by the known target IE over a period of time. The processor may generate a behavior IE that characterizes the movements, communications, or activities of the known target, determine a probability value that indicates a likelihood that the known target will approach a known collateral characterized by the known collateral IE, and determine determining that the connection condition exists in response to determining that the probability value exceeds a threshold value.

Some embodiments may include devices, systems, and methods for detecting potential security threats, suspicious behaviors or notable human activities. The embodiments may include matching collected elements identified in intelligence data to known elements. Each of the known elements may be associated with one of a creature, object, or place. Also, the known elements may include one or more targets of surveillance and a plurality of collateral elements to the surveillance. The embodiments may include determining whether a connection condition exists between a target of the one or more targets and a collateral element of the plurality of collateral elements in the received intelligence data. In addition, an alert message may be transmitted in response to determining the connection condition exists between the target and the collateral element.

In some embodiment, the connection condition may exist in response to the target and the collateral element being identified either within a predetermined distance of one another or in communication with one another; in response to the target and the collateral element previously being identified a threshold number of times either within the predetermined distance of one another or in communication with one another; in response to the target and a predetermined number of the plurality of collateral elements being identified either within a predetermined distance of one another or in communication with one another; in response to another collateral element being identified either within a predetermined distance of or in communication with the target and the collateral element; in response to a composite rating of both the target and the collateral element being above a rating threshold, wherein the composite rating is based on a risk rating of each of the target and the collateral element; and in response to a determined behavior vector of the target indicating the target is more likely than not to approach the collateral element.

Some embodiments may also include receiving the intelligence data and identifying the collected elements in the received intelligence data that matches the known elements. The collected elements may be derived from at least one record selected from the group consisting of images, video, audio, documentation, biomarker usage, and previously analyzed data.

Further embodiments may include means for performing functions corresponding to the method operations discussed above. Further embodiments may include a non-transitory processor-readable storage medium having stored thereon processor-executable instructions configured to cause a processor to perform various operations corresponding to the method operations discussed above. Further embodiments may include a processing device including a processor configured with processor-executable instructions configured to a computing device to perform various operations corresponding to the method operations discussed above.

Figure 6:
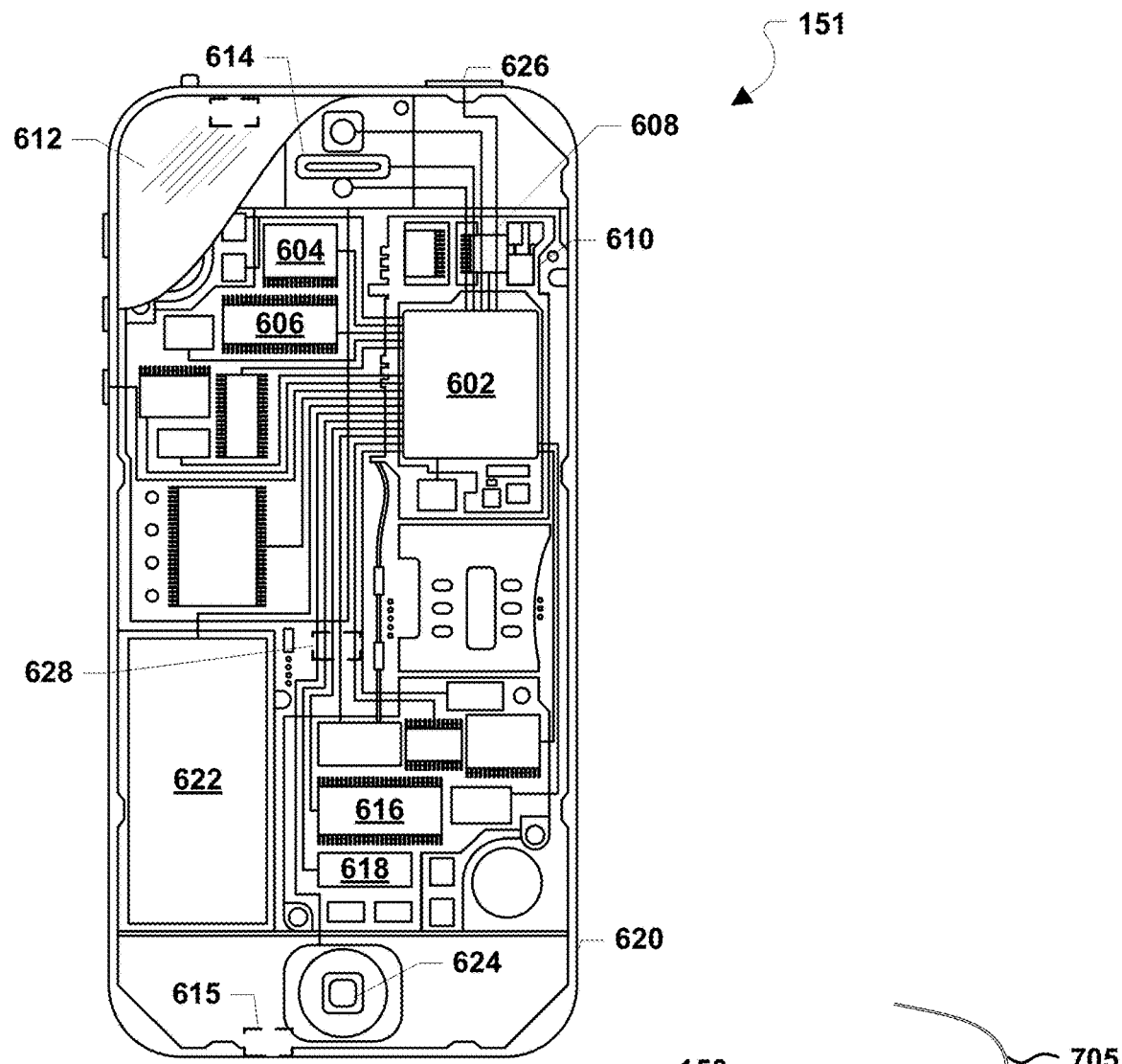
FIG. 6 is a component diagram of a client device in the form of a wireless communication device, suitable for use with various embodiments.
Figure 7:
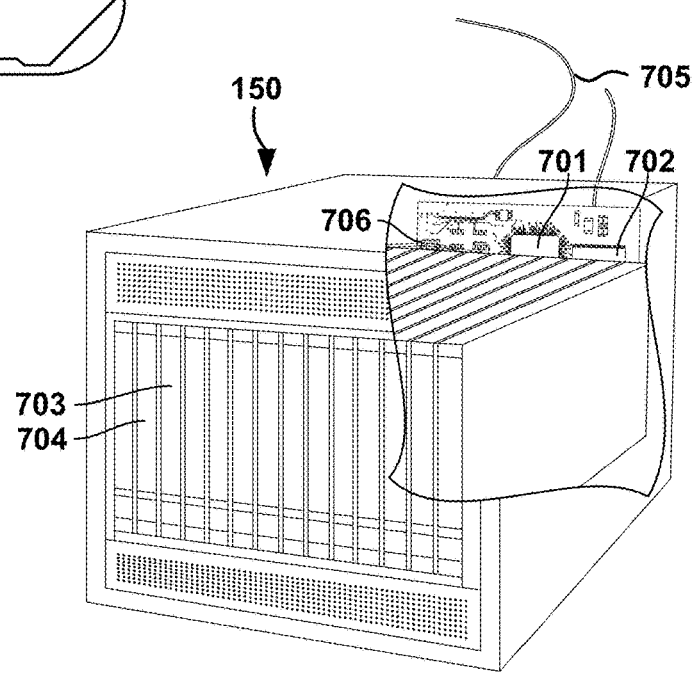
FIG. 7 is a component diagram of a managing computing device, in the form of a server, suitable for use with the various embodiments.

In the various embodiments, the system may include any of a variety of client devices (e.g., smartphones, tablets, computers, laptop computers, smartwatches, etc.), an example of which is illustrated in FIG. 6. The client device 151 may include a processor 602 coupled with the various systems of the client device 151 for communication with and control thereof. For example, the processor 602 may be coupled to a touch screen controller 604, radio communication elements, speakers and microphones, and an internal memory 606. The processor 602 may be one or more multi-core integrated circuits designated for general or specific processing tasks. The internal memory 606 may be volatile or non-volatile memory, and may also be secure and/or encrypted memory, or unsecure and/or unencrypted memory, or any combination thereof. In another embodiment (not shown), the client device 151 may also be coupled to an external memory, such as an external hard drive.

The touch screen controller 604 and the processor 602 may also be coupled to a touch screen panel 612, such as a resistive-sensing touch screen, capacitive-sensing touch screen, infrared sensing touch screen, etc. Additionally, the display of the client device 151 need not have touch screen capability. The client device 151 may have one or more radio signal transceivers 608 (e.g., Peanut, Bluetooth, Bluetooth LE, ZigBee, Wi-Fi®, radio frequency (RF) radio, etc.) and antennae, the mobile computing device antenna 610, for sending and receiving communications, coupled to each other and/or to the processor 602. The radio signal transceivers 608 and the mobile computing device antenna 610 may be used with the above-mentioned circuitry to implement the various wireless transmission protocol stacks and interfaces. The client device 151 may include a cellular network wireless modem chip 616 coupled to the processor that enables communication via a cellular network.

The client device 151 may include a peripheral device connection interface 618 coupled to the processor 602. The peripheral device connection interface 618 may be singularly configured to accept one type of connection, or may be configured to accept various types of physical and communication connections, common or proprietary, such as USB, FireWire, Thunderbolt, or PCIe. The peripheral device connection interface 618 may also be coupled to a similarly configured peripheral device connection port (not shown).

In various embodiments, the client device 151 may include microphones 615. For example, the mobile computing device may have a microphone 615 for receiving voice or other audio frequency energy from a user during a call. The client device 151 may also include speakers 614 for providing audio outputs. The client device 151 may also include a housing 620, constructed of a plastic, metal, or a combination of materials, for containing all or some of the components discussed herein. The client device 151 may include a power source 622 coupled to the processor 602, such as a disposable or rechargeable battery. The rechargeable battery may also be coupled to the peripheral device connection port to receive a charging current from a source external to the client device 151. The client device 151 may also include a physical button 624 for receiving user inputs. The client device 151 may also include a power button 626 for turning the client device 151 on and off.

In some embodiments, the client device 151 may further include an accelerometer 628, which senses movement, vibration, and other aspects of the device through the ability to detect multi-directional values of and changes in acceleration. In the various embodiments, the accelerometer 628 may be used to determine the x, y, and z positions of the client device 151. Using the information from the accelerometer, a pointing direction of the client device 151 may be detected.

Various forms of computing devices may be used to communicate with a processor of the client devices (e.g., 151, 152, 153), including personal computers, mobile computing devices (e.g., smartphones, etc.), servers, laptop computers, etc., to implement the various embodiments including the embodiments described with reference to FIGS. 1-7. Such computing devices may typically include, at least, the components illustrated in FIG. 7, which illustrates an example server computing device. With reference to FIGS. 1-7, the server 700 may typically include a processor 701 coupled to volatile memory 702 and large capacity nonvolatile memory 703, 704, such as a disk drive. The managing computing device 150 may also include one or more disc-drives (e.g., compact disc (CD) or digital versatile disc (DVD)) coupled to the processor 701. The managing computing device 150 may also include network access ports 705 (or interfaces) coupled to the processor 701 for establishing data connections with a network, such as the Internet and/or a local area network coupled to other system computers and servers. Similarly, the managing computing device 150 may include additional access ports 706, such as USB, Firewire, Thunderbolt, and the like for coupling to peripherals, external memory, or other devices.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

As used in this application, the terms "component," "engine," "system," and the like may may refer to a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution, and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, components, modules, circuits, and algorithm operations described in connection with the embodiments disclosed herein may be implemented as electronic hardware, computer software, or combinations of both. To clearly illustrate this interchangeability of hardware and software, various illustrative components, blocks, components, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of detecting a potential security threat in a computing system, the method comprising:
    receiving, via a processor in a computing device of the system, intelligence data that includes at least one of an image, sound recording, biometric information, or communication transaction information;
    determining, by the processor, whether a known target information element (IE) and a known collateral IE are contemporaneously linked based on the received intelligence data; and
    in response to determining that the known target IE and the known collateral IE are contemporaneously linked:
        updating, by the processor, at least one of a risk rating for the known target IE and a risk rating for the known collateral IE;
        calculating, by the processor, a composite risk rating using the risk rating values of each of the known target IE and the known collateral IE;
        determining whether a connection condition exists between the known target IE and the known collateral IE based at least in part on whether the composite risk rating exceeds a rating threshold; and
        generating and transmitting, to at least one client device of the system, an alert message identifying an existence of the potential security threat in response to determining the connection condition exists between the known target IE and the known collateral IE.

2. The method of claim 1, further comprising:
    determining whether the received intelligence data includes an element of interest (EOI);
    generating or updating an EOI IE that characterizes the EOI in response to determining that the received intelligence data includes an EOI;
    determining whether the generated EOI IE matches a known IE stored in a list of known elements; and classifying the EOI IE as the known target IE or the known collateral IE in response to determining that the generated EOI IE matches at least one known IE stored in the list of known elements.

3. The method of claim 2, further comprising:
determining a first location and a first location time value for the EOI IE;
comparing the first location to location information associated with each of the known IEs stored in the list of known elements to generate comparison results;
using the comparison results to determine whether the first location is within a predetermined distance of a second location associated with a second IE stored in the list of known elements;
identifying a second location time value associated with the second IE in response to determining that the first location is within the predetermined distance of the second location associated with the second IE stored in the list of known elements;
determining whether a difference between the first location time value and the second location time value exceeds a threshold time value;
incrementing a number of contacts value in response to determining that the difference between the first location time value and the second location time value does not exceed the threshold time value; and
wherein determining whether the connection condition exists between the known target IE and the known collateral IE comprises:
determining whether the number of contacts value exceeds a max contacts threshold value; and
determining that the connection condition exists in response to determining that the number of contacts value exceeds the max contacts threshold value.

4. The method of claim 3, further comprising:
determining a communications value that identifies a number of communications within a predefined amount of time between the EOI and an element characterized by the second IE; and
incrementing the number of contacts value by the determined communications value prior to determining whether the number of contacts value exceeds the max contacts threshold value.

5. The method of claim 3, further comprising determining whether the second IE is classified as a target or collateral, wherein the operation of identifying the second location time value associated with the second IE is performed in response to:
determining that the second IE is classified as the target and the EOI IE is classified as the known target IE;
determining that the second IE is classified as the target and the EOI IE is classified as the known collateral IE; or
determining that the second IE is classified as the collateral and the EOI IE is classified as the known target IE.

6. The method of claim 2, wherein generating or updating the EOI IE that characterizes the EOI comprises:
generating or updating the EOI IE to include a location value, a time value, and one of incident data or a distinguishing feature value.

7. The method of claim 6,
wherein classifying the EOI IE as a known target element or a known collateral element comprises classifying the EOI IE as the known target element; and wherein generating or updating the EOI IE that characterizes the EOI further comprises generating or updating the EOI IE to include a list of contemporaneously identified collateral IEs.

8. The method of claim 1, wherein determining whether the connection condition exists between the known target IE and the known collateral IE comprises:
determining a number of contacts value based on contact information associated with the known target IE, contact information associated with the known collateral IE and contact information associated with a second known collateral IE;
determining whether the number of contacts value exceeds a max contacts threshold value; and
determining that the connection condition exists in response to determining that the number of contacts value exceeds the max contacts threshold value.

9. The method of claim 1, further comprising:
monitoring movements, communications, or activities of a known target characterized by the known target IE over a period of time;
generating a behavior IE that characterizes movements, communications, or activities of the known target;
determining a probability value that indicates a likelihood that the known target will approach a known collateral characterized by the known collateral IE; and
determining whether the probability value exceeds a threshold value,
wherein determining whether the connection condition exists between the known target IE and the known collateral IE comprises determining that the connection condition exists in response to determining that the probability value exceeds the threshold value.

10. A computing device, comprising:
a processor configured with processor-executable instructions to perform operations comprising:
receiving intelligence data that includes at least one of an image, sound recording, biometric information, or communication transaction information;
determining whether a known target information element (IE) and a known collateral IE are contemporaneously linked based on the received intelligence data; and
in response to determining that the known target IE and the known collateral IE are contemporaneously linked:
updating at least one of a risk rating for the known target IE and a risk rating for the known collateral IE;
calculating a composite risk rating using the risk rating values of each of the known target IE and the known collateral IE;
determining whether a connection condition exists between the known target IE and the known collateral IE based at least in part on whether the composite risk rating exceeds a rating threshold; and
generating and transmitting, to at least one client device, an alert message identifying an existence of a potential security threat in response to determining the connection condition exists between the known target IE and the known collateral IE.

11. The computing device of claim 10, wherein the processor is configured with processor-executable instructions to perform operations further comprising:
determining whether the received intelligence data includes an element of interest (EOI);
generating or updating an EOI IE that characterizes the EOI in response to determining that the received intelligence data includes an EOI;

determining whether the generated EOI IE matches a known IE stored in a list of known elements; and classifying the EOI IE as the known target IE or the known collateral IE in response to determining that the generated EOI IE matches at least one known IE stored in the list of known elements.

12. The computing device of claim 11, wherein the processor is configured with processor-executable instructions to perform operations further comprising:

determining a first location and a first location time value for the EOI IE;

comparing the first location to location information associated with each of the known IEs stored in the list of known elements to generate comparison results;

using the comparison results to determine whether the first location is within a predetermined distance of a second location associated with a second IE stored in the list of known elements;

identifying a second location time value associated with the second IE in response to determining that the first location is within the predetermined distance of the second location associated with the second IE stored in the list of known elements;

determining whether a difference between the first location time value and the second location time value exceeds a threshold time value;

incrementing a number of contacts value in response to determining that the difference between the first location time value and the second location time value does not exceed the threshold time value; and wherein determining whether the connection condition exists between the known target IE and the known collateral IE comprises:

determining whether the number of contacts value exceeds a max contacts threshold value; and determining that the connection condition exists in response to determining that the number of contacts value exceeds the max contacts threshold value.

13. The computing device of claim 12, wherein the processor is configured with processor-executable instructions to perform operations further comprising:

determining a communications value that identifies a number of communications within a predefined amount of time between the EOI and an element characterized by the second IE; and incrementing the number of contacts value by the determined communications value prior to determining whether the number of contacts value exceeds the max contacts threshold value.

14. The computing device of claim 12, wherein the processor is configured with processor-executable instructions to perform operations further comprising determining whether the second IE is classified as a target or collateral, wherein the operation of identifying the second location time value associated with the second IE is performed in response to:

determining that the second IE is classified as the target and the EOI IE is classified as the known target IE;

determining that the second IE is classified as the target and the EOI IE is classified as the known collateral IE; or determining that the second IE is classified as the collateral and the EOI IE is classified as the known target IE.

15. The computing device of claim 11, wherein the processor is configured with processor-executable instructions to perform operations such that generating or updating the EOI IE that characterizes the EOI comprises:

generating or updating the EOI IE to include a location value, a time value, and one of incident data or a distinguishing feature value.

16. The computing device of claim 15, wherein the processor is configured with processor-executable instructions to perform operations such that classifying the EOI IE as a known target element or a known collateral element comprises classifying the EOI IE as the known target element; and wherein the processor is configured with processor-executable instructions to perform operations such that generating or updating the EOI IE that characterizes the EOI further comprises generating or updating the EOI IE to include a list of contemporaneously identified collateral IEs.

17. The computing device of claim 10, wherein the processor is configured with processor-executable instructions to perform operations such that determining whether the connection condition exists between the known target IE and the known collateral IE comprises:

determining a number of contacts value based on contact information associated with the known target IE, contact information associated with the known collateral IE and contact information associated with a second known collateral IE;

determining whether the number of contacts value exceeds a max contacts threshold value; and determining that the connection condition exists in response to determining that the number of contacts value exceeds the max contacts threshold value.

18. The computing device of claim 10, wherein the processor is configured with processor-executable instructions to perform operations further comprising:

monitoring movements, communications, or activities of a known target characterized by the known target IE over a period of time;

generating a behavior IE that characterizes movements, communications, or activities of the known target;

determining a probability value that indicates a likelihood that the known target will approach a known collateral characterized by the known collateral IE; and determining whether the probability value exceeds a threshold value, wherein determining whether the connection condition exists between the known target IE and the known collateral IE comprises determining that the connection condition exists in response to determining that the probability value exceeds the threshold value.

19. A non-transitory computer readable storage medium having stored thereon processor-executable software instructions configured to cause a processor in a computing device to perform operations for detecting a potential security threat, the operations comprising:

receiving intelligence data that includes at least one of an image, sound recording, biometric information, or communication transaction information;

determining whether a known target information element (IE) and a known collateral IE are contemporaneously linked based on the received intelligence data; and in response to determining that the known target IE and the known collateral IE are contemporaneously linked:

updating, by the processor, at least one of a risk rating for the known target IE and a risk rating for the known collateral IE;

calculating, by the processor, a composite risk rating using the risk rating values of each of the known target IE and the known collateral IE;

determining whether a connection condition exists between the known target IE and the known collateral IE based at least in part on whether the composite risk rating exceeds a rating threshold; and generating and transmitting, to at least one client device, an alert message identifying an existence of the potential security threat in response to determining the connection condition exists between the known target IE and the known collateral IE.

\* \* \* \* \*